United States Patent
Diethorn (10) Patent No.: US 6,321,080 B1
(45) Date of Patent: Nov. 20, 2001

(54) CONFERENCE TELEPHONE UTILIZING BASE AND HANDSET TRANSDUCERS

(75) Inventor: Eric John Diethorn, Long Valley, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/268,231

(22) Filed: Mar. 15, 1999

(51) Int. Cl.[7] .......................................... H04Q 7/20
(52) U.S. Cl. ........................... 455/416; 455/569; 455/553
(58) Field of Search ..................... 455/462, 465, 455/550, 569, 570, 575, 517, 416, 420, 254, 127, 69, 70, 572, 574, 553, 63, 571; 379/420, 388, 389, 387

(56) References Cited

U.S. PATENT DOCUMENTS

| | | | |
|---|---|---|---|
| 3,743,791 | * | 7/1973 | Duff et al. ............................ 455/569 |
| 4,555,592 | * | 11/1985 | Deinzer ................................ 455/416 |
| 4,969,180 | * | 11/1990 | Watterson et al. .................. 379/56.1 |
| 4,969,181 | * | 11/1990 | Ito ........................................ 455/569 |
| 4,991,198 | * | 2/1991 | Tate et al. ............................ 455/411 |
| 5,046,081 | * | 9/1991 | Umemoto ............................ 455/462 |
| 5,133,002 | * | 7/1992 | Kikuchi et al. ...................... 455/464 |
| 5,138,651 | * | 8/1992 | Sudo .................................... 455/462 |
| 5,526,405 | * | 6/1996 | Toda .................................... 455/569 |
| 5,572,575 | * | 11/1996 | Yamamoto et al. ................. 455/412 |
| 5,649,008 | * | 7/1997 | Bader et al. ......................... 379/392 |
| 5,664,015 | * | 9/1997 | Ford et al. ........................... 379/433 |
| 5,712,911 | * | 1/1998 | Her ...................................... 379/420 |
| 5,748,707 | * | 5/1998 | Sanserino ............................ 455/570 |
| 5,752,195 | * | 5/1998 | Tsuji et al. .......................... 455/462 |
| 5,995,827 | * | 11/1999 | Gitlin et al. ......................... 455/416 |
| 6,073,031 | * | 6/2000 | Helstab et al. ...................... 455/557 |
| 6,097,971 | * | 8/2000 | Hosoi .................................. 455/570 |

* cited by examiner

Primary Examiner—Dwayne Bost
Assistant Examiner—Jean A Gelin
(74) Attorney, Agent, or Firm—Darby & Darby (57) ABSTRACT

An improved conference telephone which permits the active loudspeaker and microphone in a communication circuit to be universally positioned relative to one another. In one form, the conference telephone includes a base having a base-mounted speaker and a handset having both a handset-mounted speaker and a handset-mounted microphone. The handset-mounted microphone has at least a first sensitivity level and a second sensitivity level which is less than the first sensitivity level. A controller responds to the selection of a conference-call mode to activate the base-mounted speaker and to set the sensitivity of the handset-mounted microphone at the first sensitivity level. One method sets the conference telephone in a conference-call mode by enabling a near party to speak to a far party through a microphone mounted on one of the base and the handset, enabling the near party to listen to the far party through a speaker mounted on the other of the base and the handset, and disabling the microphone on the other of the base and the handset. Also disclosed is circuitry for optimizing the selection of the active transducer.

22 Claims, 7 Drawing Sheets

CONFERENCE TELEPHONE UTILIZING BASE AND HANDSET TRANSDUCERS

FIELD OF THE INVENTION

The present invention relates to circuits and methods for an improved speech communication system, and more particularly, to a conference telephone which utilizes one transducer from the base and one transducer from the handset to complete the communication loop.

BACKGROUND OF THE INVENTION

In a conventional conference telephone or "speakerphone," a desktop or base unit is provided which has a loudspeaker and a microphone, both of which are utilized during a conference call. Audio amplifiers are also provided to amplify the signals received from a telephone central office (that is, signals from a "far" party) to a level that is sufficient to drive the loudspeaker, and to amplify signals coupled by the microphone prior to transmission to the telephone central office (that is, signals from a "near" party). A handset having its own speaker and microphone are provided for private telephone conversations.

Because the microphone and loudspeaker in a conventional speakerphone are both mounted within the same physical enclosure and are generally proximate one another, there is a degree of acoustic coupling between the far party speech reproduced by the loudspeaker and the near party speech received at the microphone. Such coupling typically is suppressed, using an echo suppression circuit, or canceled using an echo canceling circuit. However, when the magnitude of the far party speech is great, it is difficult for the echo canceling circuit to rapidly, accurately and smoothly determine whether the audio signals constitute "near" or "far" party signals. This is particularly true during moments when both parties are speaking insofar as the far party speech may dominate the near party speech level at the microphone. As a result, even with the use of echo canceling circuitry, there can be noticeable switching or cutting out of the speech from one or both of the parties and/or a palpable reduction in the gain of the signal in an effort to reduce undesired acoustic coupling.

These problems have been recognized in the art and various approaches have been proposed. For one approach directed to continual adjustments of an echo canceling tap profile to maintain loop stability, see application Ser. No. 09/090,733, filed: Jun. 4, 1998, for SPEAKERPHONE CONTROL BASED ON ECHO CANCELER TAP PROFILE, assigned to the present assignee and hereby incorporated in its entirety by reference. The '733 patent application also provides a thorough description of the operation and circuitry of a conference telephone.

However, what still is needed in the art is an improved conference telephone which addresses these problems and improves the efficacy of conventional canceling circuits by permitting the loudspeaker and microphone to be universally positioned relative to one another.

SUMMARY OF THE INVENTION

In a broad aspect, my invention is an improved conference telephone which permits the active loudspeaker and microphone in a communication circuit to be universally positioned relative to one another.

In one form, the conference telephone of my invention includes a base having a base-mounted speaker and a base-mounted microphone, a handset having a handset-mounted speaker and a handset-mounted microphone. A control circuit responds to the selection of a conference-call mode to generate a control signal which is used by means to (1) activate either the base-mounted speaker or the base-mounted microphone, (2) activate the handset-mounted microphone if the base-mounted speaker was activated and to activate the handset-mounted speaker if the base-mounted microphone was activated, and (3) disable any microphone other than the activated microphone.

In another form, the conference telephone of my invention includes a base having a base-mounted speaker and a handset having both a handset-mounted speaker and a handset-mounted microphone. The handset-mounted microphone has at least a first sensitivity level and a second sensitivity level which is less than the first sensitivity level. A controller responds to the selection of a conference-call mode to activate the base-mounted speaker and to set the sensitivity of the handset-mounted microphone at the first sensitivity level.

My invention also concerns a method for setting a conference telephone in a conference-call mode. The method includes the steps of activating a microphone mounted on one of the base and the handset, energizing a speaker mounted on the other of the base and the handset at a level sufficient to permit a near party to hear a far party at a distance from the conference telephone, and disabling any microphone other than the activated microphone.

In another method in accordance with my invention, the conference telephone is set in a conference-call mode by enabling a near party to speak to a far party through a microphone mounted on one of the base and the handset, enabling the near party to listen to the far party through a speaker mounted on the other of the base and the handset, and disabling the microphone on the other of the base and the handset.

In further aspects of my invention, a transducer selection routine selects the optimum transducer to use at the start of a conference call. The selection is made based upon predetermined criterion, including whether the handset is in the cradle or not, test tones, and measuring signal strengths of near and far party voices through the microphones at each of the base and handset units.

BRIEF DESCRIPTION OF THE DRAWINGS

The foregoing and other features and advantages of our present invention will be more readily apparent from the following detailed description when read in conjunction with the accompanying drawings; wherein.

DETAILED DESCRIPTION

Figure 1:
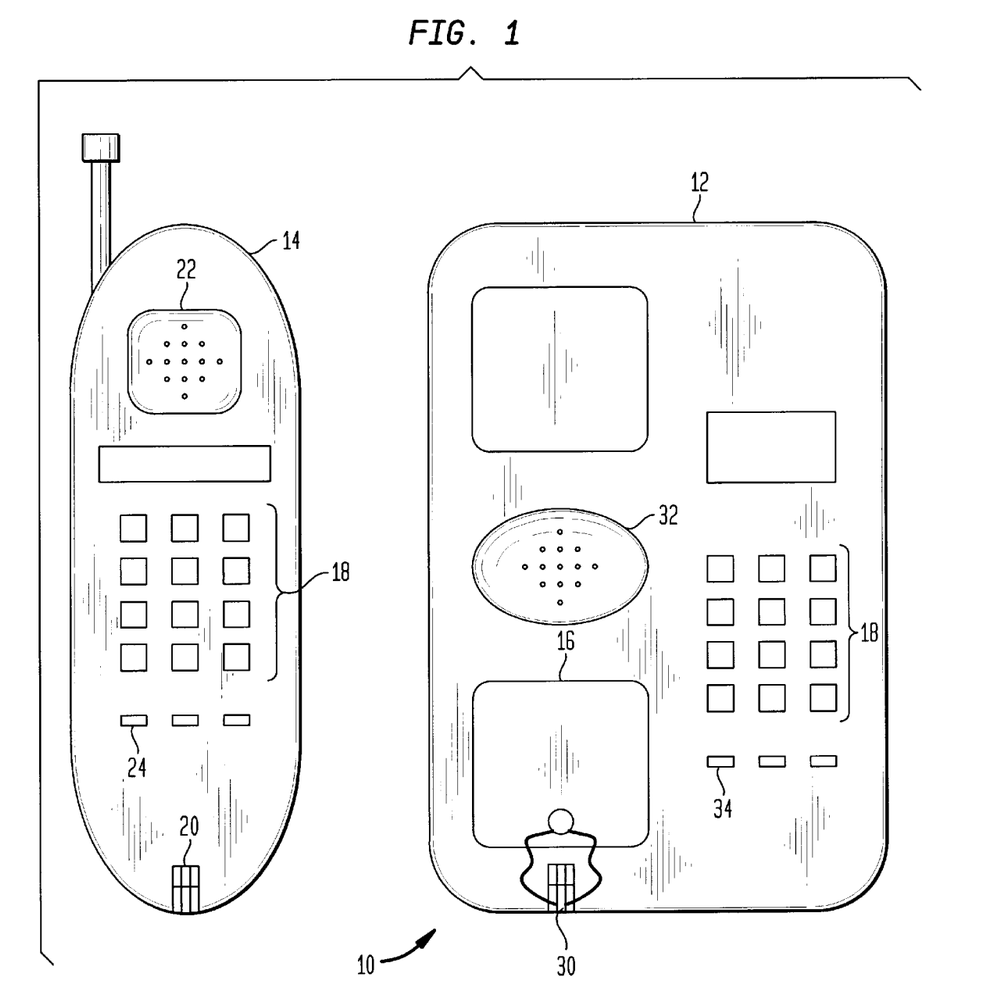
FIG. 1 illustrates a cordless conference telephone that may be used with the present invention.

By way of overview and introduction, the invention is illustrated as a speaker telephone system. The invention, however, has industrial applicability in other communication systems including internet-based and videophone communication systems. In FIG. 1, the speaker telephone system comprises a cordless conference telephone or speakerphone 10. Speakerphone 10 includes a base 12 and a handset 14. The handset 14 is battery powered and may be charged in a conventional manner when positioned in a cradle 16 of the base 12. Either or both of the base and handset may have a numeric keypad 18 which generates DTMF or pulse signals for dialing a desired telephone number out to a telephone central office.

The handset includes a microphone 20 (more generally, a receiver) and an earpiece speaker 22 (more generally, a transmitter). The base also includes a microphone/receiver 30 and a loudspeaker/transmitter 32; however, the base 12 may be configured differently, for example, by having only the loudspeaker 32 or the microphone 30 instead of both of those transducers. As used herein, the term "microphone" refers to an audio receiver of general design, and the term "speaker" or "loudspeaker" refers to an audio transmitter of general design.

In accordance with the present invention, the speakerphone 10 can be operated in a conference-call mode in which the active microphone is universally positionable relative to the active speaker. This differs substantially from conventional speakerphone arrangements in which the active microphone and loudspeaker are both mounted in the same physical enclosure. In a traditional speakerphone, the base-mounted microphone 30 and the base-mounted loudspeaker 32 are actived when the speakerphone is swithced to a conference-call mode. In such a traditional speakerphone, the handset-mounted microphone 20 and handset-mounted speaker 22 are the only active transducers when the telephone is in a private-call mode (usually, a default mode of operation). In contrast, the present invention has a microphone mounted on one of the handset and base units as the active microphone and a loudspeaker on the other unit as the active speaker. As a result, the active microphone can be freely positioned relative to the active speaker, at least within the length of coiled cord in a corded speakerphone or within the range of transmission between the handset and the base in a cordless speakerphone. In the preferred embodiment, the speakerphone 10 includes a cordless handset which communicates with the base through a conventional RF link, for example, using digital spread spectrum technology. As a practical matter, both the handset and base ordinarily are in the same room so that the near party can speak to and hear the far party.

The terms "activating" and "energizing" as used herein in connection with a transducer (that is, a microphone or speaker) refer to causing the transducer to be included or maintained in the active communication circuit at a level at which it provides an appreciable contribution to the audio signals in such communication circuit. Thus, an activated or energized transducer could have a gain or sensitivity set to contribute audio signals in the active communication circuit. Also, the term "disabling" as used herein refers to causing the transducer (1) to be turned off or (2) set/maintained at a sufficiently low level of sensitivity or gain, so as to not contribute appreciably to the audio signals in the active communication circuit.

The speakerphone 10 has several modes of operation including idle, private-call, and conference-call modes. In the idle mode, there is no call on the tip and ring lines from the telephone central office and, therefore, no communication signal between the handset and the base. In the private-call mode, communication is established between a near party and a far party through the handset 14, with the near party speaking through the handset-mounted microphone 20 and listening to the far party through the handset-mounted speaker 22. In the conference-call mode, the present invention improves on prior art systems and methods by setting the active microphone and speaker to be elements in separate physical housings so that the active microphone is universally positionable relative to the active loudspeaker by simply locating the handset 14 at any position in a room relative to the base 12.

In a preferred form, the active speaker is the base-mounted loudspeaker 32 and the active microphone is the handset-mounted microphone 20. In a cordless telephone, the handset 14 can be freely positioned relative to the base 12 to a desired location in the room so that each person in a room can speak during the conference call. By distancing the active microphone from the active speaker, the magnitude of the acoustic coupling from the active speaker into the active microphone is correspondingly lessened. In turn, this simplifies separation and cancellation of far party "echo" signals from the near party signals. As a result, the speakerphone's 10 canceling and/or suppression circuit 164 (see FIG. 7) is more effective in suppressing unwanted audio signals and minimizes any need to insert switched loss into the system.

The present invention can be implemented as a program or routine that executes in an otherwise conventional speakerphone controller, or as a discrete or integrated circuit arrangement which generates a control signal in response to the selection of the conference-all mode. Such circuitry is described below in connection with FIG. 7.

Figure 2:
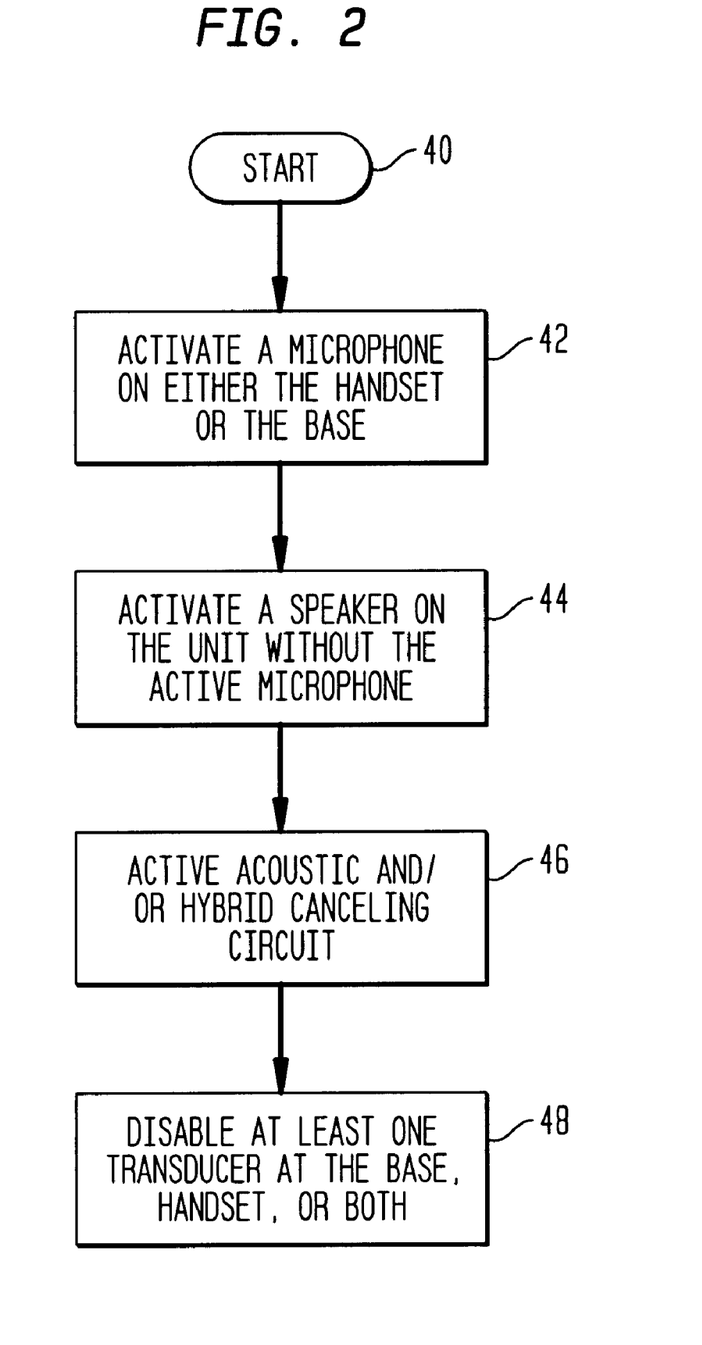
FIG. 2 is a flow diagram of a method that may be implemented using the cordless conference telephone of FIG. 1.

With reference now to FIGS. 1 and 2, the handset includes a series of undefined/function keys including a conference-call button 24 which, when pressed generates a control signal which establishes the conference call-mode of the speakerphone 10. The base 34 also includes a conference-call button 34 as well as other undefined/function keys which can be used to set the speakerphone 10 in the conference call-mode. The conference-call mode is established in response to pressing either of the buttons 24, 34 and executing the process steps generally outlined in FIG. 2.

Figure 3:
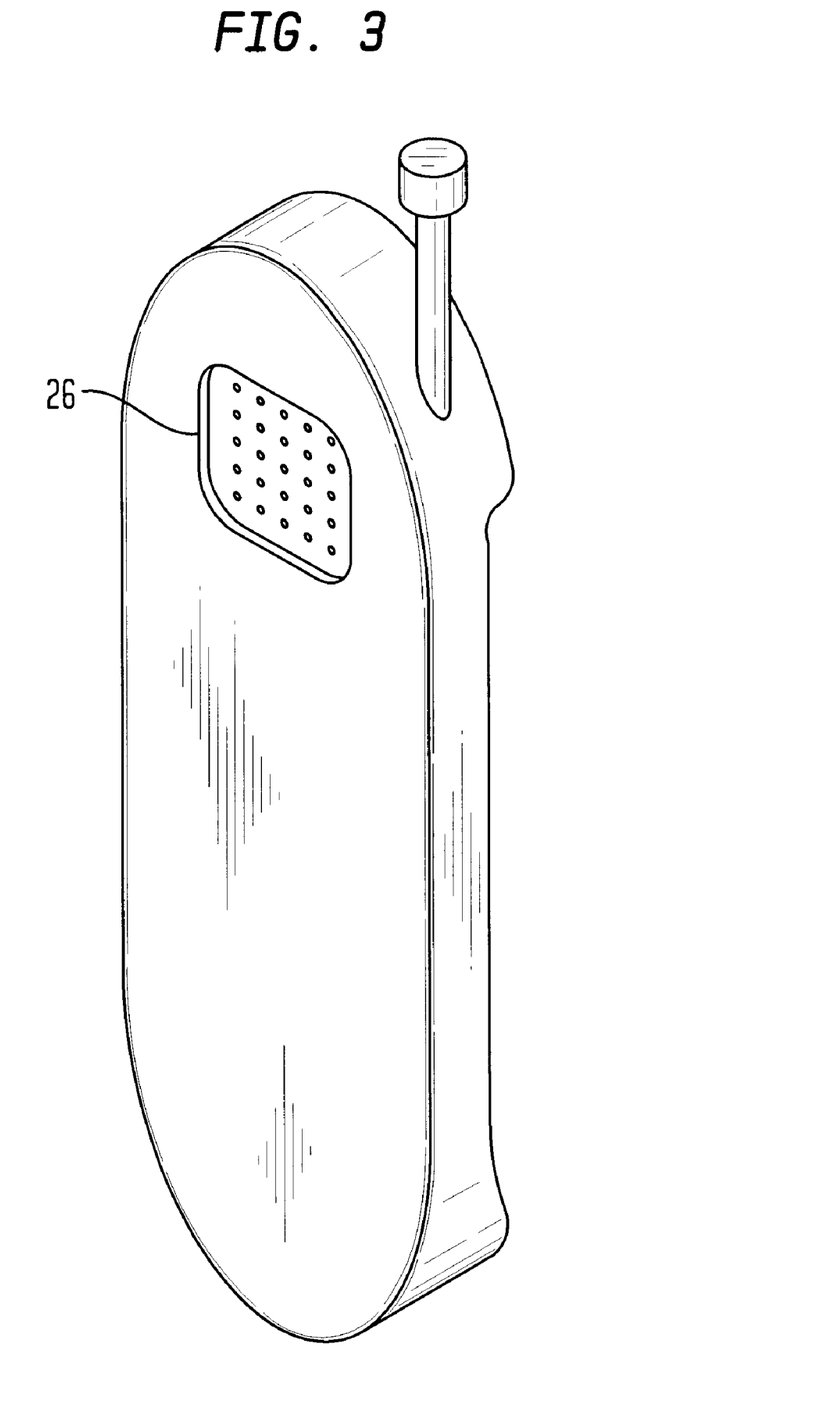
FIG. 3 illustrates a rear surface of a cordless handset that may be provided with the conference telephone of FIG. 1.

In particular, when the conference-call button 24, 34 is pressed on the speakerphone 10, a conference call mode starts at step 40 by generating a control signal within the speakerphone 10. In response to the control signal, either the handset-mounted microphone 20 or the base-mounted microphone 30 is selected and activated at step 42. Also, a loudspeaker is activated on the handset or base unit which was not selected at step 42. Thus, if the handset microphone 20 were activated at step 42, then the base-mounted loudspeaker 32 would be activated at step 44. On the other hand, if a base-mounted microphone 30 was activated at step 42, then a handset-mounted speaker would be activated at step 44. The activated handset-mounted speaker can be the earpiece speaker 22 as shown in FIG. 1, or a second handset-mounted speaker 26, for example, on the rear surface of the handset as shown in FIG. 3. The second speaker 26 may be different in form than the speaker 22, for example, it may be a conventional loudspeaker suitable for driving at the level sufficient to permit a near party to hear a far party at a distance from the handset 14.

Preferably, an acoustic and/or hybrid canceling circuit is activated at step 46 to remove echos and other artifacts from the telephone call. Alternatively or in addition, an echo suppression circuit may be activated at this step. At step 48, at least one transducer at the base 12, handset 14, or both is disabled. In the arrangement of FIG. 1, for example, both the handset and base have microphones but only one of the microphones 20, 30 will be active in the communication circuit and the other will be disabled at step 48. As another illustration, in an arrangement in which the base has only a speaker 32, the base-mounted speaker 32 and the handset-mounted microphone 20 will be the active transducers, and the handset-mounted speaker 22 (and/or the speaker 26 on the backside of the handset) will be disabled.

Figure 4:
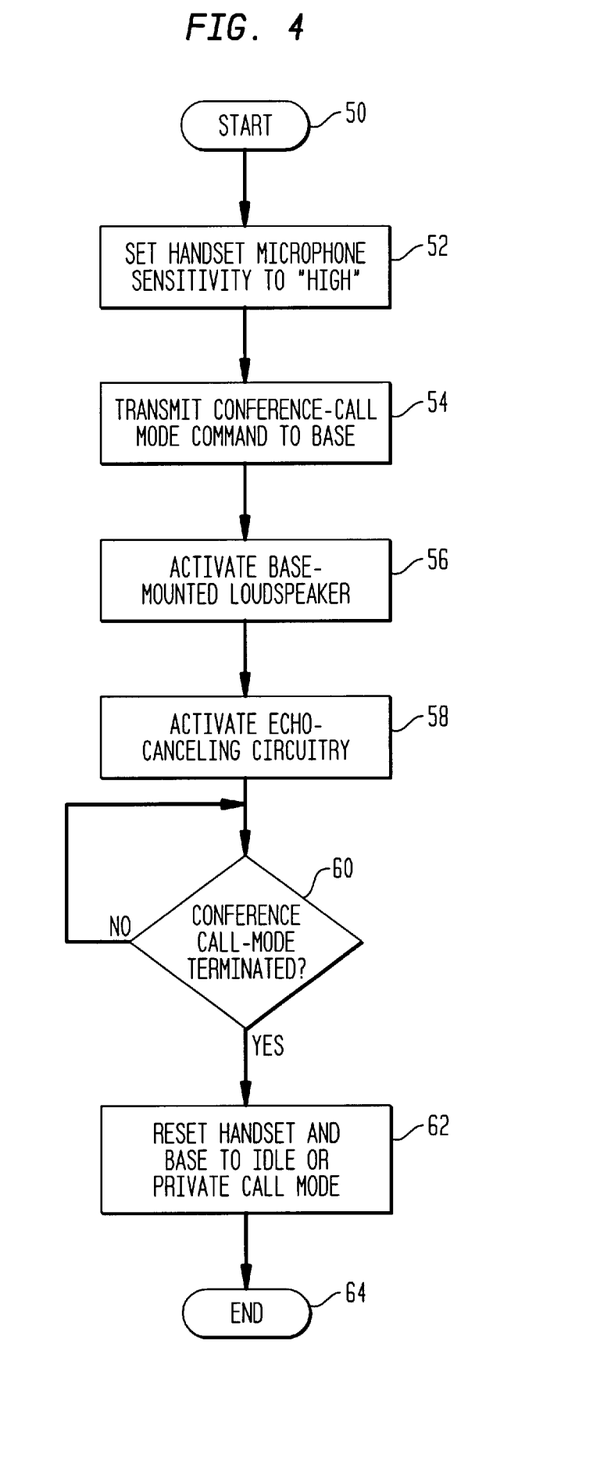
FIG. 4 is a detailed flow diagram of a method in accordance with the invention which is triggered by activating a conference-call mode at the handset unit of FIG. 1.

A specific example in which the conference-call mode is established at the handset 14 is now described in connection with the flow diagram of FIG. 4. In this example, the conference-call mode is established at step 50 by pressing button 24 on the handset 14 of the cordless speakerphone 10. For purposes of this example, we assume that there is no base-mounted microphone 30 such that the handset-mounted microphone 20 is the only microphone. By pressing button 24 at the handset, the near party switches the speakerphone 10 either from a private-call mode in which case a call had already been established, or from an idle mode in which case the near party makes a request for service to the base so that a call can be established.

The conference-call mode is configured by a controller which operates in accordance with a programmed routine. The controller programmed to implement the steps of FIG. 4 responds to the selection of the conference-call mode by setting the handset-mounted microphone 20 from a second sensitivity state to a higher, first sensitivity state at step 52. The handset speaker 22 is also disabled in a more particular embodiment of the invention. Also in response to pressing the button 24, a command in the form of a control signal is sent at step 54 through a wireless link to the base 12 to advise the base unit that the conference-call mode has been selected so that the base 12 can configure itself for the conference call. Upon receiving the transmitted command, a controller responds to the selection of the conference-call mode at step 56 to activate the base-mounted loudspeaker 32 and also to activate echo-canceling circuitry at step 58. The conference-all mode will subsist until the call is terminated or the near party selects the private-call mode, as tested at step 60. The test is repeatedly performed by the routine of FIG. 4 until either condition is satisfied. Upon terminating the call to place the speakerphone 10 in the idle mode, or selecting a private-call mode, the handset 14 and base 12 are both reset to the selected operating mode at step 62. Resetting the handset entails resetting the gain of the microphone 20 to a sensitivity level appropriate for a private call during which the near party speech is direct and proximate the microphone, that is, to the second sensitivity level referred to above. Resetting the base entails disabling the base-mounted loudspeaker 32 and any active echo-canceling circuitry. If the handset 14 is returned to the cradle 16, then the circuitry at each of the handset and the base can be reset without a command from the other. However, in the event that the near party using the handset 14 switches operating modes from a conference-call mode to a private-call mode, by again pressing the button 24, then a command is sent to the base which causes the base to disable the base-mounted loudspeaker 32 and any active echo-canceling circuitry. The routine of FIG. 4 then ends, as shown at 64.

Figure 5:
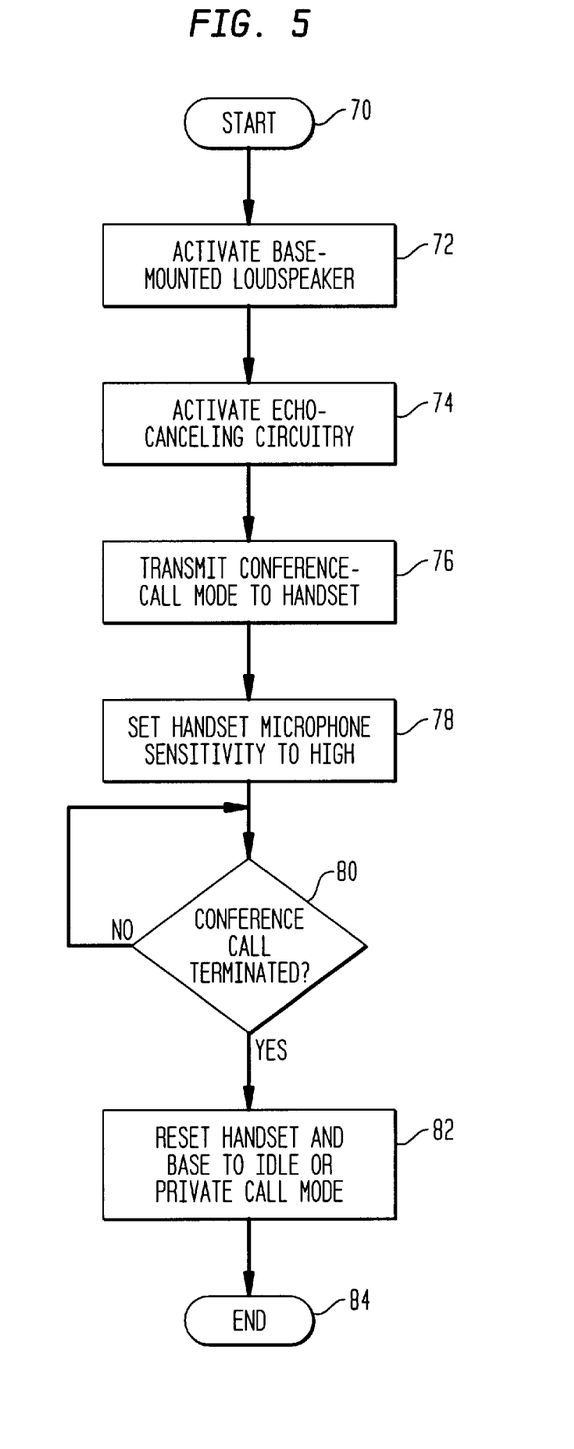
FIG. 5 is a detailed flow diagram of a method in accordance with the invention which is triggered by activating a conference-call mode at the base unit of FIG. 1.

In a second specific example, the conference-call mode is established at the base 12 instead of at the handset 14. As in the prior example, the cordless speakerphone for this example lacks the base-mounted microphone 30. With reference now to the flow diagram of FIG. 5, the conference-call mode is established at step 70 by pressing button 34 on the base 12. The loudspeaker 32 and echo canceling circuitry 164 (See FIG. 7) are activated at steps 72 and 74, respectively, as described above. In response to pressing the button 34, a command is conveyed at step 76 to the handset 14 to advise the handset that the conference-call mode has been selected so that the controller in the handset 14 can configure the handset for the conference call. Upon receiving the transmitted command, the handset-mounted microphone 20 is activated and set to a "high" (first) sensitivity level at step 78 so that the microphone can pick up the near party speech of anyone in the room. As in the prior example, the conference-call mode subsists until the call is terminated or the near party selects the private-call mode, as tested at step 80. The test is repeatedly performed until either condition is satisfied, at which point the handset 14 and base 12 are both reset at step 82, substantially as described above in connection with step 62. If the handset is not in the cradle 16 when the conference-call mode is terminated, a command will originate with the handset if button 24 is pressed or with the base if button 34 is pressed. In either case, the telephone circuitry will be reset as described above. Thereafter, the routine of FIG. 5 ends, as shown at 84.

When the speakerphone 10 includes a base-mounted microphone 30 as shown in FIG. 1, either the handset-mounted microphone 20 or the base-mounted microphone 30 will be disabled from the communication circuit when the conference-call mode is selected. In other words, there will be only one active receiver for near party speech in the conference-call mode, with all other microphones being disabled from the telephone call.

The selection of the microphone and speaker to use during a conference call can be automatically made by controllers in the handset and base units based on a predetermined criterion using selection circuitry 160 within the speakerphone 10 (see FIG. 7), in accordance with a further aspect of the present invention. The predetermined criterion may be a test as to whether the handset 14 is in the cradle 16 and selecting a specific speaker and microphone if the handset is in-cradle and a different speaker microphone if the handset is out-of-cradle. For example, if the handset is in cradle when the conference-call mode is selected (e.g., by pressing the button 34 on the base), then the base-mounted speaker 32 and the base-mounted microphone 30 are selected, in this example. This mode of operation does not benefit from the present invention because the active transducers are mounted in the same housing. If the handset, however, were out-of-cradle then the predetermined criterion could select the base-mounted speaker 32 and the handset-mounted microphone 20, or vice versa. This rule can be implemented using a conventional in-cradle/out-of-cradle circuit 162 (see FIG. 7) which examines the electrical state across the charge contacts to determined in the handset is in-cradle or out-of-cradle.

Another predetermined criterion which may be used as the basis for selecting the active transducers uses an optimization routine which automatically determines which of the two microphones and which of the two loudspeakers will result in the best speakerphone communications fidelity. An optimum selection of a loudspeaker and microphone can be made based upon the degree of acoustic coupling between the two transducers at their present locations. Ordinarily, such a selection is not an issue because the selected transducers are mounted in the same physical enclosure at a predetermined spacing from one another. However, because the handset is freely positionable relative to the base, the degree of acoustic coupling can be measured when the conference-call mode is selected, with the resulting measurements used to select which transducers are to be made active and/or the sensitivity/gain of the transducers.

The distance between the active speaker and microphone is a dominant factor in acoustic coupling issues, although other factors affect the degree of coupling between transducers. In any event, for a given distance, there are two or more microphone/speaker pairs that can be selected (e.g., microphone/ speaker pairs: 20/32, 30/22, and 30/26). The selection circuit 160 and optimization routine make a transducer selection on the basis of one or more criteria, including the distance between the transducers. Specifically, the selection circuit responds to the selection of the conference-call mode, that is, to a press of one of the buttons 24, 34 by initially activating a loudspeaker and microphone pair, and then determining whether the activated microphone constitutes the optimum selection at that moment in time. If the initially activated microphone is determined as not being the best choice, then the other microphone will be activated in place of the initially activated one.

Figure 6:
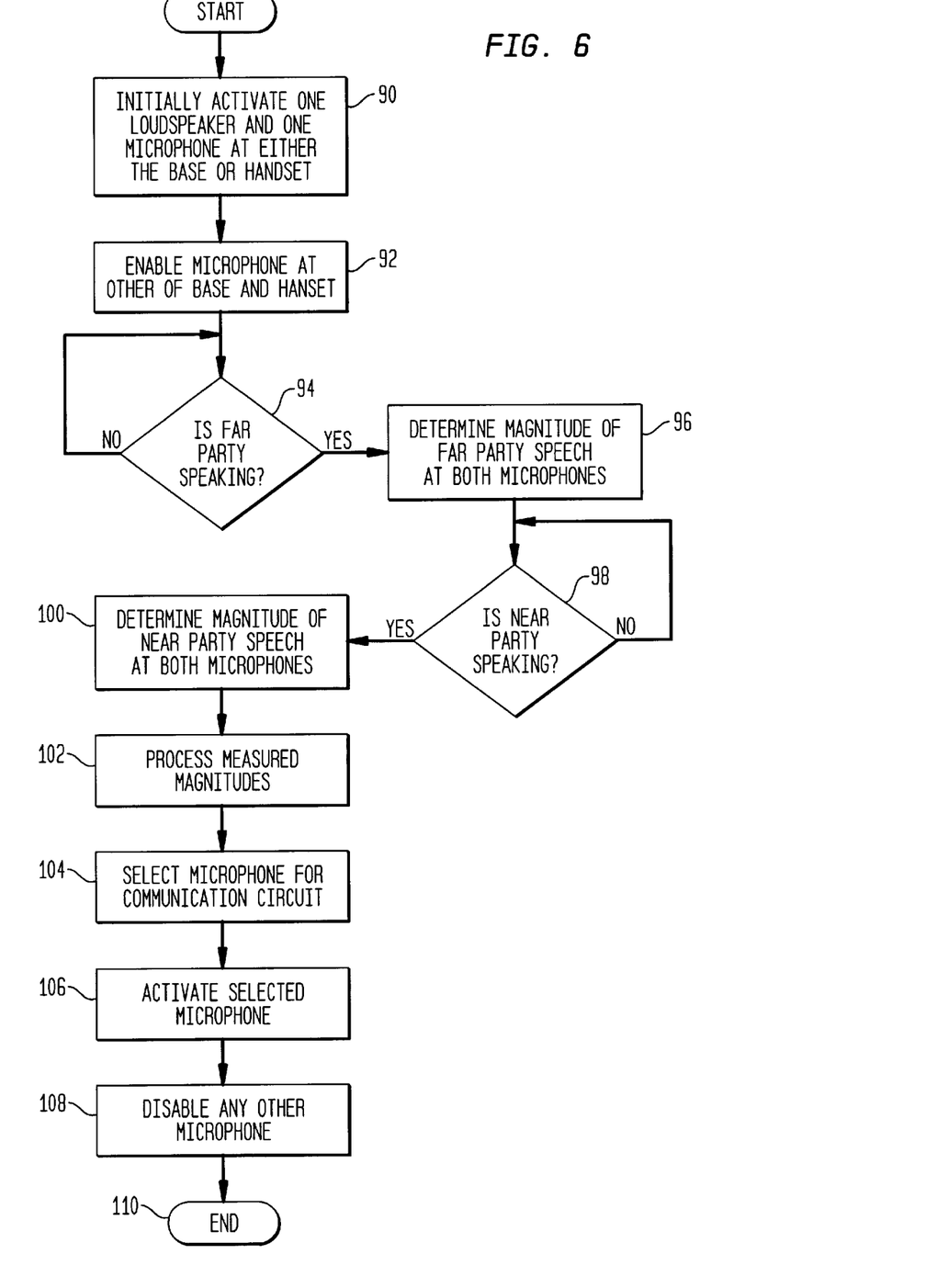
FIG. 6 is a detailed flow diagram of a transducer selection method in accordance an aspect of the invention which is triggered by activating a conference-call mode.

Preferably, in response to pressing the conference-call button 34 at the base 12 the base-mounted loudspeaker 32 and the base-mounted microphone 30 are activated to provide normal speakerphone functionality, as shown at step 90 of FIG. 6. In addition, the handset-mounted microphone is enabled at step 92, but is excluded from the active communication circuit. The audio signals that are coupled by the enabled handset-mounted microphone are monitored to measure the magnitude of near and far speech levels at that microphone. Because the base-mounted microphone is "active" in the communication circuit, the magnitude of near and far speech levels at that microphone can readily be measured as well.

The selection circuit 160 determines when the far party is speaking at step 94, for example, using a conventional voice-activity detector (VAD) that constantly monitors the phone's receive voice path. The construction of a VAD is not material to the present invention. When far party speech is detected, the magnitude of that speech as emitted by the activated loudspeaker is measured at step 96, both at the base-mounted microphone 30 (Far_b_mic) and the handset-mounted microphone 20 (Far_h_mic). Also, when the near party is speaking and the far party is not, as detected at step 98, the magnitude of the speech at the base-mounted microphone 30 is measured (Near_b_mic). Simultaneously, at step 100, the magnitude of the speech at the handset-mounted microphone 20 is measured (Near_h_mic). A VAD provided in the speech path of both microphones enables the measurement of the magnitude of the near and far party speech. The measured magnitudes Far_b_mic, Far_h_mic, Near_b_mic and Near_h_mic are then processed by an optimization routine at step 102 to determine the best microphone to use.

Preferably, the initially activated microphone (which may either be in the base or the handset) is disabled and the microphone in the other physical enclosure (that is, in the handset or the base, respectively) is then activated only if the following two conditions are satisfied, which conditions are expressed below for the case of the base-mounted speaker and microphone being the transducers that are initially activated:

1) Far_h_mic<Far_b_mic; and
2) Near_h_mic/Near_b_mic>=0.5. If these two conditions are not satisfied, the active microphone and speaker will remain the transducers at the base 12. The first condition gauges the degree of acoustic coupling of far party speech from the base-mounted speaker 32 to the handset-mounted microphone 20 relative to the degree of coupling of far party speech between the transducers mounted in the base 12. The second condition compares the relative proximity of the handset-mounted microphone and the base-mounted microphone to the near party's speech by comparing relative magnitudes of the audio signal coupled by the two microphones. The test threshold (>=0.5) is arbitrary; what is important is that its value ensure that the selected microphone is near the speaking party.

The foregoing steps 90–102 may take place during the first few seconds of a conference call during a first exchange of words between the near and far parties. As a result of the processing step 102, a microphone is selected at step 104 to be the active microphone for the remainder of the conference call, and is so activated at step 106, if not active already. Any other microphone (e.g. microphone 30 if microphone 20 was activated, and vice versa) is then disabled at step 108. The selection routine ends at step 110.

Were the conference-call button 24 at the handset pressed rather than the button 34 at the base, then the initially activated transducers could be the transducers on the handset (e.g., speaker 22 or 26, if present, and microphone 20), with the base-mounted microphone in an enabled, out-of-communication-circuit state so that signal strengths can be measured at both microphones substantially as described above. Were the conference call button 24 to be pressed, the same steps 90–110 would proceed, except that the test conditions would be:

1) Far_b_mic <Far_h_mic; and
2) Near_b_mic/Near_h_mic>=0.5.

Alternatively, the selection routine may cause training tones or pink noise to emanate from the speakers 22, 26, and 32 for 100 to 500 ms which are picked up by the microphones 20 and 30, wherever they may be positioned, and the microphone/speaker pair selected based on the strength of the signals coupled at the microphones, as described below.

A speakerphone 10 which implements the process flows of FIGS. 2 and 4–6 includes circuitry that processes audio signals received from the near party at the microphones 20, 30 and then conveys them over a communication system (e.g., telephone system). Likewise, audio signals received from a far party at the speakerphone 10 from the communication system are processed and provided to the speakers 22, 26 and 32. The processing includes, among other steps, filters and echo cancelers and suppressors which improve the fidelity of the audio signals. Such processing is not the subject of the present invention, is well known in the art, and is described in the aforementioned '733 patent application.

Figure 7:
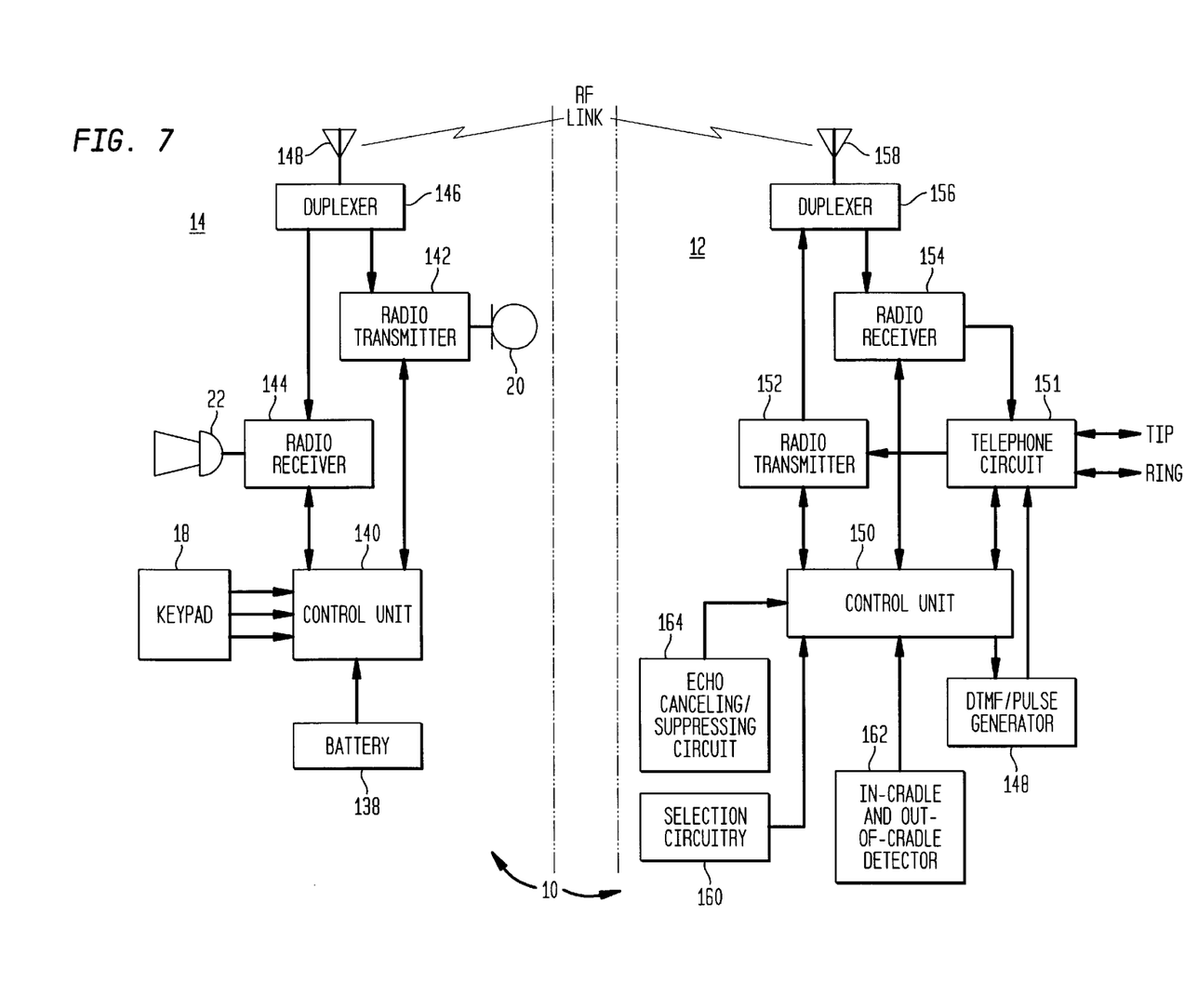
FIG. 7 is a functional block diagram of the components that may comprise the cordless conference telephone of FIG. 1.

A functional block diagram of a cordless telephone which incorporates the conference telephone arrangement of the present invention is shown in FIG. 7. As shown, the cordless telephone comprises the base 12 and handset 14 which are operable over a plurality of communication channels through an RF link. Within the handset 14 is a control unit or circuit 140 which provides a number of control functions necessary for the proper operation of the speakerphone 10 and which constitutes one of the means necessary to activate or disable the handset-mounted speaker and microphone. The control unit 140 is preferably implemented through the use of a programmed microprocessor containing a read only memory (ROM) and random access memory (RAM). Suitable microprocessors are long known in the art and are readily available from semiconductor manufacturers such as Signetics, Intel and Advanced Micro Devices. Among other functions, the control unit 140 configures a radio frequency (RF) transmitter 142 and an RF receiver 144 for operation on each of a plurality of digital or analog channels. Preferably, a cordless speakerphone uses a digital frequency hopping spread spectrum (FHSS) technique well known in the art for the RF communication between the handset and the base. The transmitter 142 and the receiver 144 respectfully transmit signals to and receive signals from the base 12 with the control unit 140 providing appropriate channel information to both units to maintain the integrity of the communication path.

The transmit and receives signals of the handset 14 are coupled to a duplexer 146 which permits the transmitter 142 and the receiver 144 to both simultaneously operate over an antenna 148 at the handset while preventing the output of the transmitter 142 from being coupled directly to the input of the receiver 144. The receiver 144 demodulates voice signals transmitted by the base 12 and couples these signals to a loudspeaker 22. The transmitter 142 has as its input "near" party speech signals from the microphone 20 which it transmits to the base 12. A battery 138 provides operating power for all circuitry in the handset 14 and the keypad 18 permits the user to dial digits and execute control functions using the control unit 140.

At the base unit 12, a control unit 150 coordinates with the control unit 140 to establish a two-way communications link between the handset 14 and the base 12 and constitutes another means which activates or disables the base-mounted speaker and microphone. The control unit 150 can be implemented through the use of the microcomputer containing ROM, RAM and through the use of proper coding, as described above in connection with the control unit 140. The base 12 further includes an antenna 158 connected to a duplexer 156 which couples the input of a receiver 154, that is the "near" party signal from the handset 14, and the output of a transmitter 152, that is the "far" party signal sent over the tip and ring lines of the communication circuit. A telephone circuit 151 serves as a "plain old telephone service" (POTS) interface for signals on the tip and ring lines, or, more generally, may be an interface to other communication systems including ISDN, wireless cellular communication system, voice-over-internet communication system, etc. The connection of the speakerphone terminals is not material to the invention; all that is important is that near and far party speech be provided to and sent from the speakerphone 10. The base operates under the control of the control unit 150, interacting with the telephone circuit, transmitter and receiver, as well as a DTMF/pulse generator associated with the keypad 18 on the base.

Through the control units 140, 150, the handset 14 and base 12 generate and exchange security code data which are matched prior to sending a request for service signal out to a central office through the telephone circuit 151. This may be done, for example, when the handset is in the cradle 16. For further information on security data, see U.S. Pat. No. 4,736,404 issued to R. E. Anglikowski, et al. on Apr. 5, 1988.

While the foregoing conference telephone has been described in detail with respect to a cordless telephone, the invention also applies to corded telephones. In a corded telephone, the handset is freely movable within the range permitted by the connecting cord. Because movement of the handset is somewhat restricted, all of the controls can be provided on the base unit.

While a second speaker on the handset has been described as providing an amplified signal suitable for projecting far-party sounds into a room, the earpiece transducer can be used in lieu of a second speaker. In this alternative arrangement, the earpiece speaker can have two gain modes, with a lower-gain mode being suitable for placing the speaker adjacent the ear of the user and a higher-gain mode which permits the far party to be heard in a room.

While an illustrative embodiment of our invention has been described above, it is, of course, understood that various modifications will be apparent to those of ordinary skill in the art. Such modifications are within the spirit and scope of our invention, which is limited and defined only by the appended claims.

I claim:

1. A conference telephone, comprising:
    a) a base having a base-mounted speaker and a base-mounted microphone;
    b) a handset having a handset-mounted speaker and a handset-mounted microphone, the handset being movable relative to the base;
    c) a control circuit responsive to the selection of a conference-call mode to generate a control signal;
    d) first means responsive to the control signal for activating either the base-mounted speaker or the base-mounted microphone;
    e) second means responsive to the control signal for activating the handset-mounted microphone if the base-mounted speaker was activated and for activating the handset-mounted speaker if the base-mounted microphone was activated; and
    f) third means responsive to the control signal for disabling any microphone other than the activated microphone.

2. The conference telephone as in claim 1, wherein the disabling means causes the sensitivity of any microphone other than the activated microphone to be set so as to couple a substantially reduced magnitude of near party audio signal as compared to the magnitude of near party audio signal being coupled by the activated microphone.

3. The conference telephone as in claim 1, wherein the handset and base are communicatively connected to one another through a cordless connection.

4. The conference telephone as in claim 1, further comprising a selector means responsive to a predetermined criterion for governing which of the transducers is activated by the first and second means.

5. The conference telephone as in claim 4, wherein the predetermined criterion is the response of the base-mounted and handset-mounted microphone to a training signal.

6. The conference telephone as in claim 4, wherein the predetermined criterion includes a comparison of the magnitude of a near party signal coupled by each of the handset- and base-mounted microphones.

7. The conference telephone as in claim 4, wherein the predetermined criterion includes a comparison of the magnitude of a far party signal coupled by each of the handset- and base-mounted microphones.

8. The conference telephone as in claim 4, wherein the predetermined criterion includes separate comparisons of the magnitudes of the near party signals coupled by each of the handset- and base-mounted microphones and the far party signals coupled by each of the handset- and base-mounted microphones.

9. In a conference telephone of the type having a base and a movable handset communicatively connected to one another, a method for setting the conference telephone in a conference-call mode, comprising the steps of:
    a) activating a microphone mounted on one of the base and the handset;

b) energizing a speaker mounted on the other of the base and the handset at a level sufficient to permit a near party to hear a far party at a distance from the conference telephone; and c) disabling any microphone other than the activated microphone.

10. The method as in claim 9, wherein the step of disabling causes the sensitivity of any microphone other than the activated microphone to be set so as to couple a substantially reduced amount of near party audio signal as compared to the amount of near party audio signal being coupled by the activated microphone.

11. The method as in claim 9, wherein the handset and base are communicatively connected through a cordless connection.

12. The method as in claim 9, including the additional step of transmitting a control signal between the base and the handset in response to a selection of the conference-call mode.

13. The method as in claim 12, wherein the activated speaker is the speaker mounted on the base, the activated microphone is the microphone mounted on the handset, and the control signal causes any microphone mounted on the base to be disabled.

14. The method as in claim 12, wherein the control signal causes the sensitivity of the activated microphone to be increased until the conference-call mode is terminated.

15. The method as in claim 9, including the further step of applying an echo-canceling circuit to the signals coupled by the activated microphone.

16. The method as in claim 9, wherein the step of activating the microphone includes selecting the microphone based on a predetermined criterion.

17. The method as in claim 16, wherein the predetermined criterion is the response of the base-mounted and handset-mounted microphone to a training signal generated prior to conveying any audio signals between the near and far parties.

18. The method as in claim 16, wherein the predetermined criterion includes a comparison of the magnitude of the near party signal coupled by each of the handset- and base-mounted microphones.

19. The method as in claim 16, wherein the predetermined criterion includes a comparison of the magnitude of the far party signal coupled by each of the handset- and base-mounted microphones.

20. The method as in claim 9, wherein both the base and the handset have microphones, the handset-mounted microphone being selected after activating the base-mounted speaker only if the ratio of the magnitudes of the near party signals coupled by the handset-mounted microphone to base-mounted microphone exceeds a predetermined value and if the magnitude of the far party signal coupled by the handset-mounted microphone is less than the magnitude of the far party signal coupled by the base-mounted microphone.

21. In a cordless conference telephone of the type having a base and a handset, a method for setting the conference telephone in a conference-call mode comprising the steps of:

a) enabling a near party to speak to a far party through a microphone mounted on one of the base and the handset;

b) enabling the near party to listen to the far party through a speaker mounted on the other of the base and the handset; and c) disabling the microphone on the other of the base and the handset.

22. The method as in claim 21, wherein the disabling step sets the sensitivity of the microphone so as to couple a substantially reduced amount of near party audio signal as compared to the amount of near party audio signal being coupled by the activated microphone.

* * * * *